Dec. 20, 1932.                J. ERBEL                 1,891,875
                          BRAKE MECHANISM
                    Filed Oct. 30, 1931        3 Sheets-Sheet 1
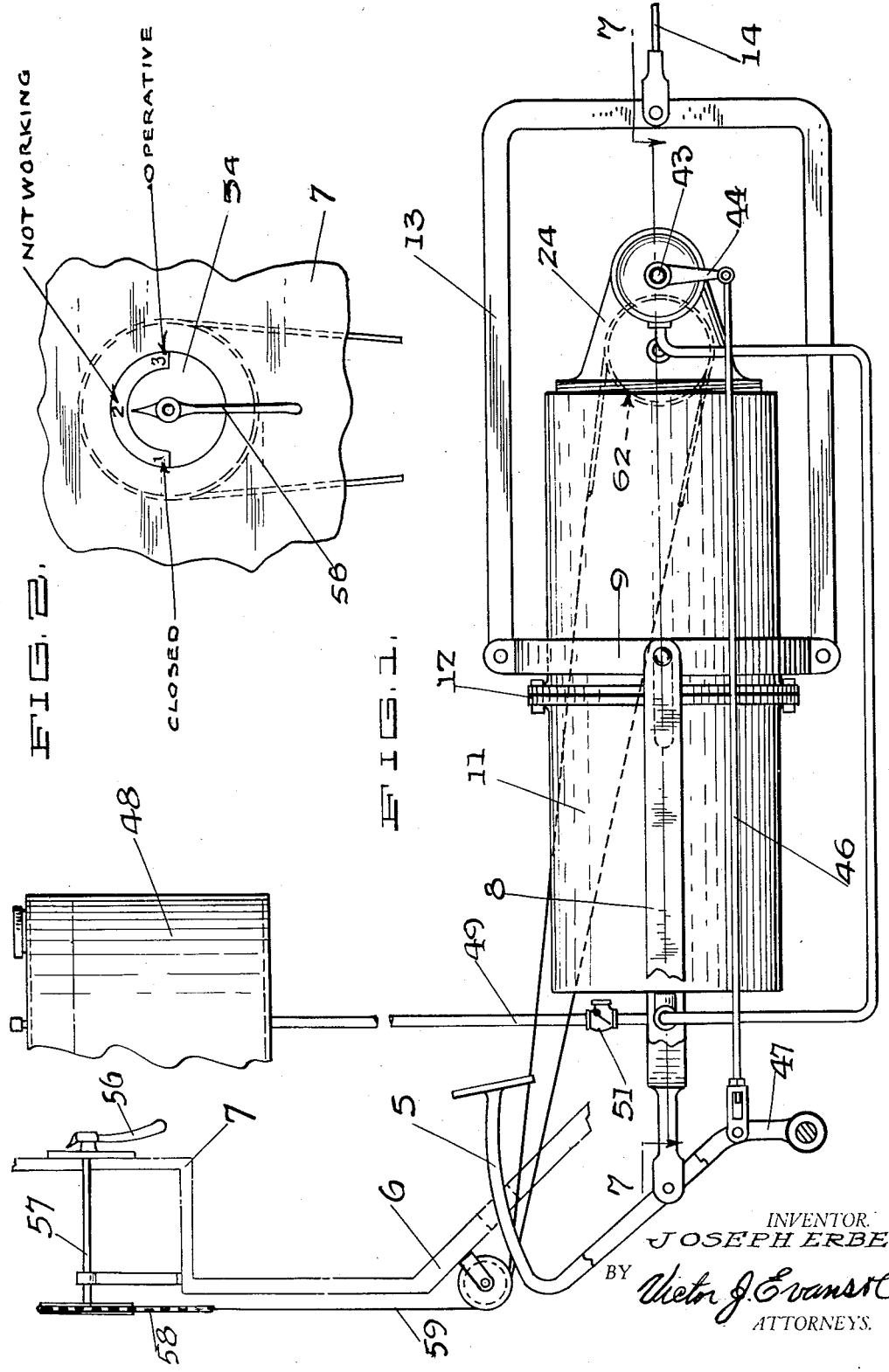

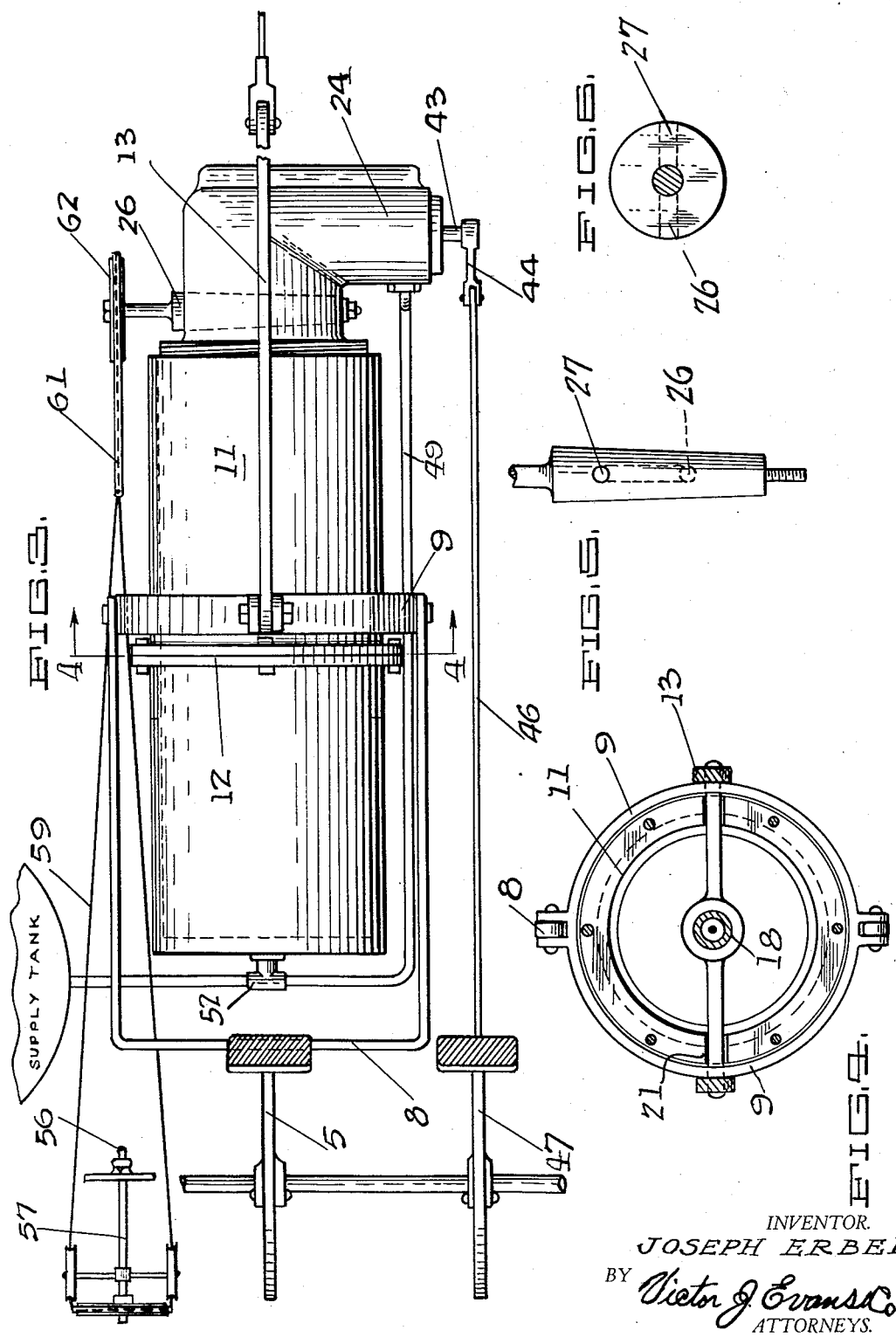

Dec. 20, 1932.  J. ERBEL  1,891,875
BRAKE MECHANISM
Filed Oct. 30, 1931   3 Sheets-Sheet 3
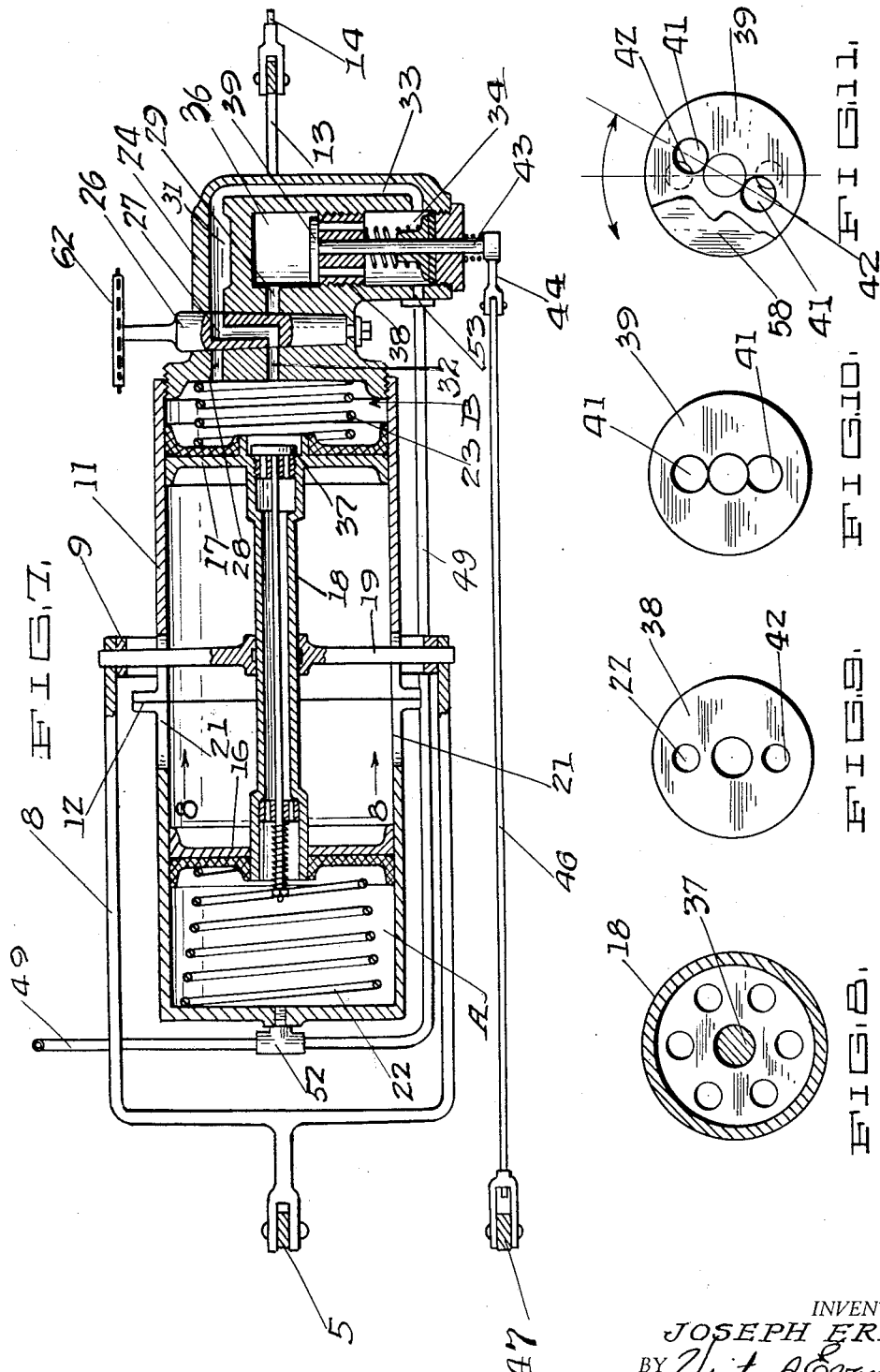
INVENTOR.
JOSEPH ERBEL.
BY Victor J. Evans & Co
ATTORNEYS.

Patented Dec. 20, 1932

1,891,875

UNITED STATES PATENT OFFICE

JOSEPH ERBEL, OF SAN FRANCISCO, CALIFORNIA

BRAKE MECHANISM

Application filed October 30, 1931. Serial No. 572,124.

This invention relates to improvements in brake mechanism and has particular reference to means for holding the ordinary foot brake after the brakes have been applied.

A further object is to provide means whereby the brakes may be released at the proper interval when the clutch is being engaged.

A still further object is to produce a device which may be attached to the ordinary brake system of the motor vehicle.

Other objects and advantages will be apparent during the course of the following description.

In the accompanying drawings forming a part of this specification and in which like numerals are employed to designate like parts throughout the same, Fig. 1 is a side elevation of my device, Fig. 2 is a front elevation of the control lever, Fig. 3 is a top plan view of Fig. 1, Fig. 4 is a cross sectional view taken on the line 4—4 of Fig. 3, Fig. 5 is a side elevation of the control valve, Fig. 6 is an enlarged end elevation of the valve, Fig. 7 is a cross sectional view taken on the line 7—7 of Fig. 1, Fig. 8 is an enlarged detail cross sectional view taken on the line 8—8 of Fig. 7, Fig. 9 is an end view of the clutch valve support, Fig. 10 is an end view of the clutch valve, and Fig. 11 is a diagrammatic view showing the manner in which the clutch valve actuates.

My device is adapted to be attached to a motor vehicle having a standard braking system which is actuated by the customary brake pedal 5 the foot board of the vehicle being shown at 6 and the dash at 7. Connected to the brake pedal 5 is a yoke 8 which connects to a band 9 extending around and movable over a cylinder 11, which cylinder is mounted stationary upon the motor vehicle. This cylinder is preferably made of two parts and joined together as at 12. A second yoke 13 connects to the band 9 and is in turn connected to the pull rod 14 of the brake system. Within the cylinder 11 is a dumb-bell-shaped piston having end plates 16 and 17 which are connected by a hollow tubular member 18. This piston is adapted to be moved within the cylinder through the medium of cross piece 19, which extends through slots 21 formed in the side of the cylinder and journaled in the ring 9. Each of the plates 16 and 17 is provided with the customary packing and springs 22 and 23 are interposed between the respective ends of the piston and the ends of the cylinder.

Secured to one end of the cylinder 11 is a casting 24 within which is positioned a rotary valve 26 having a port 27 formed therein. This port is so arranged that it may connect port 28 with port 29 or port 31 with port 32. The port 31 connects to a by-pass 33 which communicates with a chamber 34. The port 29 communicates with a chamber 36. The ports 28 and 32 both communicate with one end of the cylinder 11. The tubular member 18 contains a spring actuated valve 37, the purpose of which will be later described.

A plug 38 mounted within the casting 24 is so arranged as to support a clutch valve 39 having ports 41 in such a manner that these ports may register with ports 42 extending through the plug 38. In order to rotate this clutch valve 39, I provide a shaft 43 which has an arm 44, which connects through a rod 46 to the clutch pedal 47. As the device must be filled with oil, in order to be operative, I employ a tank 48 which is supplied with suitable air pressure and connected by a pipe 49 through a check valve 51 and a T-connection 52 to one end of the cylinder 11. This pipe continues and enters the chamber 34, as at 53.

In order to rotate the valve 26, I preferably employ upon the dash board 7, a dial 54 over which an indicator moves through the medium of a handle 56. This handle is connected through a rod 57 to any suitable driving mechanism, in the present instance I have shown a chain 58, which is connected by a cable 59 to a similar chain 61, which passes over a sprocket 62 secured to the valve 26.

We will now assume that the device is installed upon a motor vehicle and that the system has been filled with oil, with the exception of that portion of the device between the plates 16 and 17. Now assuming that the handle 56 is in the position indicated in Fig. 2, the pointer indicating the numeral 2, the operator may step upon the brake pedal with the result that the motion therefrom will be transferred through the yoke 8, band 9, yoke 13 to pull rod 14. At the same time the cross piece 19 which is attached to the tubular piece 18 will cause the two pistons to move in unison and toward the left of the drawing (see Fig. 7), therefore, the oil trapped in the space A will pass through the tubular member 18 and pass the valve 37 into the space B. As soon as the brake is released this oil will escape through the port 32, port 27 of the valve 26, port 31, by-pass 33, chamber 34, pipe 49, T-connection 52 and back to the chamber A. Therefore, when this handle 56 is in this vertical position, the brake may be actuated in the ordinary manner.

Now assuming that it is desired to hold the brake in set position, the actuation will be the same as just described, with the exception that after the brake has been applied, the handle 56 will be moved to the position indicated on the dial, indicated by the numeral 1. This will cause the valve 26 to be rotated through the cable 59 and its connections into a position where all of the ports connecting the valve will be closed and therefore the oil between the right hand end of the piston and the casting, will be trapped in the space B and the brakes will be held set.

Now assuming that the driver wishes to get away without stalling the engine, he will start the engine, place his foot upon the clutch which action will first rotate the valve 39, so that the ports 41 will pass the ports 42 in a clockwise direction. By now moving the handle 56 so that it points to the numeral 3 on the dial, the valve 26 will be so arranged that oil may flow from the chamber B through the port 28 and ports 29 into the chamber 36. As this chamber is already filled with oil, it is obvious that during this moving of the valve 26 no oil will escape from the chamber B and the brake will, therefore, still be held. By now coming back on the clutch pedal so as to engage the clutch, the valve 39 will now move in a counter clockwise direction with the result that the ports 41 will gradually uncover the ports 42, which will permit oil to flow from the chamber 36 through the ports thus opened and into the chamber 34, from which points it may flow through the pipe 49 and T-connection 52 to the chamber A. As soon as this occurs the brakes will be gradually released and in direct proportion as the clutch takes hold.

It will thus be seen that I have produced a device which will accomplish all the objects above set forth.

It is to be understood that the form of my invention herewith shown and described is to be taken as a preferred example of the same and that various changes relative to the material, size, shape and arrangement of the various parts may be resorted to without departing from the spirit of the invention or the scope of the subjoined claims.

Having thus described my invention, I claim:—

1. In a braking mechanism for a motor vehicle having a brake system including a brake pedal and a pull rod, a dumb-bell piston interposed between said pedal and said pull rod, a stationary cylinder surrounding said piston, a fluid interposed between the ends of said piston and said cylinder, and means for controlling the flow of said fluid between the opposite ends of said cylinder comprising a hollow tube connecting opposite ends of said piston.

2. In a braking mechanism for a motor vehicle having a brake system including a brake pedal and a pull rod, a dumb-bell piston interposed between said pedal and said pull rod, a stationary cylinder surrounding said piston, a fluid interposed between the ends of said piston and said cylinder, means for controlling the flow of said fluid between the opposite ends of said cylinder, said means including a by-pass connecting opposite ends thereof said piston, and a valve interposed in said by-pass for the purpose specified.

3. In a braking mechanism for a motor vehicle having a brake system including a brake pedal and a pull rod, a dumb-bell piston interposed between said pedal and said pull rod, a stationary cylinder surrounding said piston, a fluid interposed between the ends of said piston and said cylinder, means for controlling the flow of said fluid between the opposite ends of said cylinder, said means including a by-pass extending between the ends of said piston, and a spring actuated valve interposed in said by-pass.

4. In a braking mechanism for a motor vehicle having a brake system including a brake pedal and a pull rod, a dumb-bell piston interposed between said pedal and said pull rod, a stationary cylinder surrounding said piston, a fluid interposed between the ends of said piston and said cylinder, means for controlling the flow of said fluid between the opposite ends of said cylinder, said means including a by-pass extending between the ends of said piston, a valve interposed in said by-pass, and a second valve cooperating with said first mentioned valve for effecting a by-pass of fluid from one end of the cylinder to the other.

In testimony whereof I affix my signature.

JOSEPH ERBEL.